United States Patent
Ting et al.

(10) Patent No.: US 8,203,295 B2
(45) Date of Patent: Jun. 19, 2012

(54) MOTOR STARTING CONTROL METHOD, MOTOR DRIVING SYSTEM AND MOTOR SYSTEM

(75) Inventors: Chia-Min Ting, Taoyuan County (TW); Hsin-Hung Chou, Changhua County (TW); Kuo-Lin Chiu, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 355 days.

(21) Appl. No.: 12/706,350

(22) Filed: Feb. 16, 2010

(65) Prior Publication Data

US 2011/0121768 A1 May 26, 2011

(30) Foreign Application Priority Data

Nov. 25, 2009 (TW) ............................ 98140236 A (51) Int. Cl.
*H02P 6/04* (2006.01)

(52) U.S. Cl. ......... 318/400.11; 318/400.32; 318/400.04; 318/602; 318/701; 318/434; 355/30; 702/57; 123/90.17; 123/90.31

(58) Field of Classification Search ............. 318/400.06, 318/685, 400.01, 603, 799, 715, 434, 432, 318/433, 652, 400.1, 712, 592, 600, 400.02, 318/701, 400.09; 355/30; 702/57; 123/90.17, 123/90.31
See application file for complete search history.

(56) References Cited

U.S. PATENT DOCUMENTS

| | | | |
|---|---|---|---|
| 4,845,418 A | 7/1989 | Conner | |
| 5,406,385 A | 4/1995 | Iguchi et al. | |
| 5,530,326 A | 6/1996 | Galvin et al. | |
| 5,650,886 A | 7/1997 | Codilian et al. | |
| 5,668,425 A | 9/1997 | Marioni et al. | |
| 5,721,478 A | 2/1998 | Vezinet et al. | |
| 5,807,509 A | 9/1998 | Shrier et al. | |
| 5,977,734 A | 11/1999 | Lu et al. | |
| 6,066,931 A | 5/2000 | Morris et al. | |
| 6,218,794 B1 | 4/2001 | Shimizu et al. | |
| 7,079,459 B2 | 7/2006 | Watt et al. | |
| 7,095,204 B2 | 8/2006 | Lee et al. | |
| 7,112,900 B2 | 9/2006 | Brotto | |
| 7,202,623 B2 | 4/2007 | Zhou et al. | |
| 7,239,103 B2 | 7/2007 | Ho | |
| 7,271,562 B2 | 9/2007 | Lee et al. | |
| 7,531,983 B2 | 5/2009 | Jeong et al. | |
| 7,944,164 B2 * | 5/2011 | Liu et al. .................. | 318/400.33 |
| 2007/0040529 A1 * | 2/2007 | Takebayashi et al. ........ | 318/685 |

* cited by examiner

*Primary Examiner* — Walter Benson
*Assistant Examiner* — Jorge Carrasquillo
(74) *Attorney, Agent, or Firm* — Morris Manning & Martin LLP; Tim Tingkang Xia, Esq.

(57) ABSTRACT

A method for controlling starting of a motor is described, which is mainly applicable to estimate a possible initial position of a rotor of a motor by detecting a rotor rotation signal of the motor, and find out a most possible initial position of the rotor after making statistics. In the method for controlling the starting of the motor, a starting angle position region of the motor is calculated simply by using the rotor rotation signal of the motor, without additionally arranging a Hall sensor, so as to save a cost of a Hall device and an assembling cost. Furthermore, accuracy for estimating the starting position region can be increased according to an accuracy specification of products, thereby achieving a high flexibility.

27 Claims, 9 Drawing Sheets

MOTOR STARTING CONTROL METHOD, MOTOR DRIVING SYSTEM AND MOTOR SYSTEM

CROSS-REFERENCE TO RELATED APPLICATIONS

This non-provisional application claims priority under 35 U.S.C. §119(a) on Patent Application No(s). 098140236 filed in Taiwan, R.O.C. on Nov. 25, 2009, the entire contents of which are hereby incorporated by reference.

BACKGROUND OF THE INVENTION

1. Field of the Invention

The present invention relates to a servo motor starting control method, and more particularly to a starting control method for detecting a starting angle position of a rotor of a servo motor by using an incremental encoder instead of a Hall device.

2. Related Art

With the rapid progress of technologies, the controlling function of a servo motor plays a quite important role in both conventional industry and high-tech industry. In contrast, as the chip manufacturing technologies have been improved, it is an inevitable trend to develop towards the directions of multi-function, high performance, and low cost in the field of controlling the servo motor. Currently, the development direction of the servo motor driver mainly lies in improving the performance of the driver and reducing the cost. The consideration of the cost and the demand for reducing the cost are correspondingly increased while improving the performance and enhancing the functions. In the servo driver, the demand for the position of the servo motor is quite important, and if an angle position of the servo motor fails to be obtained, the servo motor cannot be controlled highly efficiently.

Figure 1:
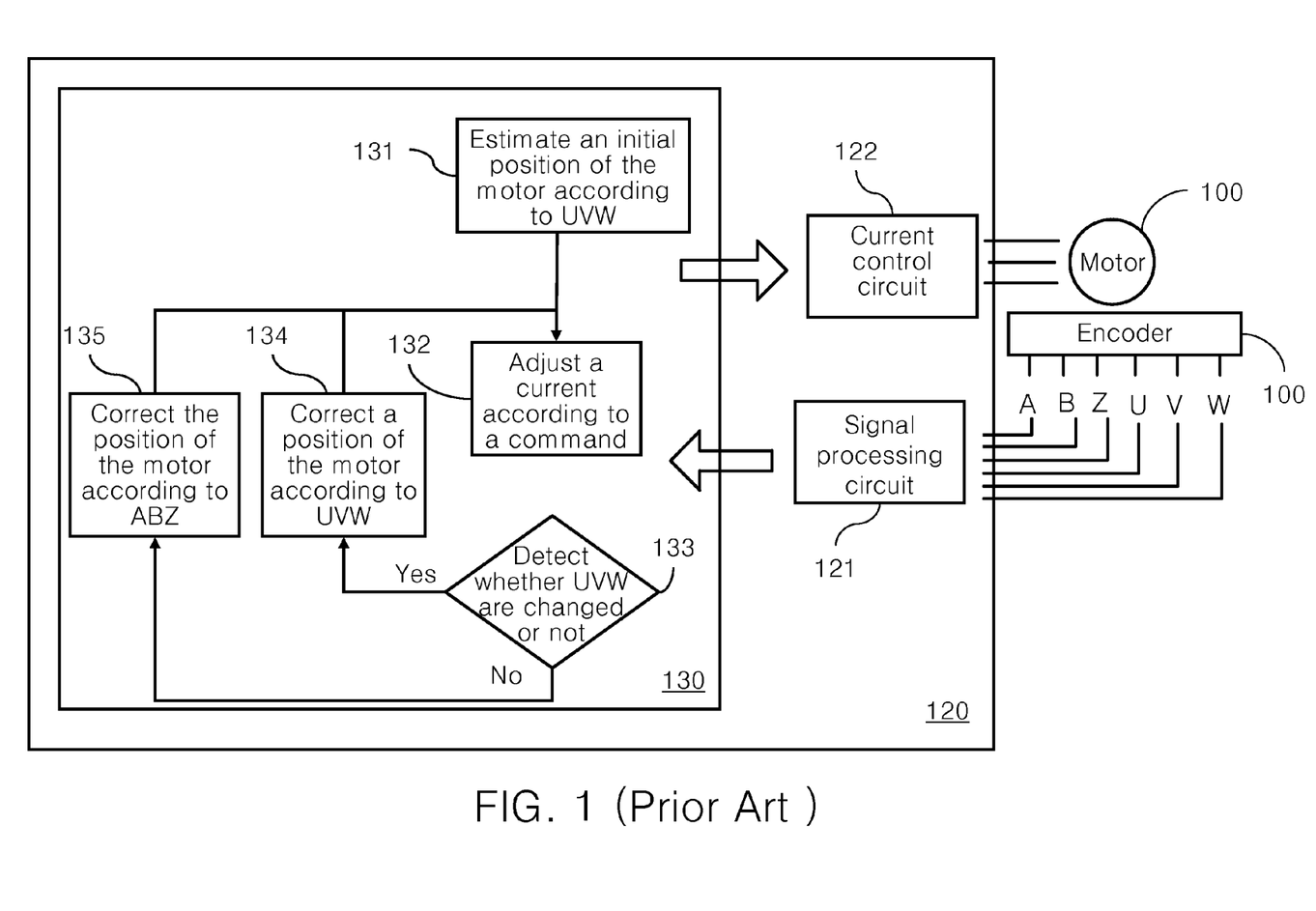
FIG. 1 is a schematic view of a servo motor driving system in the prior art.

Currently, the starting angle position of the servo motor is mostly obtained by using an incremental encoder installed with a Hall sensor. A typical servo motor driving circuit may be obtained with reference to FIG. 1, and FIG. 1 is a schematic view of a servo motor driving circuit in the prior art. When a motor 100 is initially rotated, a Hall sensor in an encoder 110 detects the motor 100, outputs phase change signals (U, V, and W), and then outputs rotor rotation signals (A, B, and Z), so as to feed back a rotation control associated message required by a servo driver 120. The phase change signals (U, V, and W) output by the encoder 110 are received and processed by a signal processing circuit 121, and then provided to a control unit 130 for estimating a position of the motor. The control unit 130 stores a firmware program. In the program, firstly, an initial position of the motor is estimated according to the phase change signals (U, V, and W) (Step 131); next, a current is adjusted according to a command (Step 132), and the adjusted current is output to a current control circuit 122 to control the rotation of the motor; and then, it is detected whether the phase change signals (U, V, and W) are changed or not (Step 133). Specifically, if the phase change signals (U, V, and W) are changed, the position of the motor is corrected according to the phase change signals (U, V, and W) (Step 134), and if the phase change signals (U, V, and W) are not changed, the position of the motor is corrected according to the rotor rotation signals (A, B, and Z) (Step 135).

The above-mentioned example is a typical technique for estimating the position by using the encoder installed with the Hall device, such that the incremental encoder in the common servo motor driver is configured with a circuit interface for the Hall device, and a control board is also configured with a chip for processing signals of the Hall device. Therefore, in consideration of reducing the cost, if the Hall device can be omitted, an area of the circuit board is reduced, and a cost of a connector on the circuit interface for the Hall device, a cost of the chip for processing the signals, and a cost of signal transmission lines are all reduced. However, if the Hall device is not used, an initial angle of the rotor cannot be obtained. Thus, if a method for obtaining a starting angle is provided, the above costs can be saved, and a stability of the driver can be improved. The more the elements on the circuit board are, the lower the stability of the driver will be. Once a problem occurs to the driver, the debugging procedure is rather complicated, and the maintenance cost is increased accordingly. If the chip and interface associated with the Hall device are not used, not only the stability is improved, but also the maintenance cost is lowered. Therefore, if a method capable of detecting the starting angle position of the servo motor is provided, and in the method, the motor is not required to rotate or is only required to slightly rotate during the detection, great economic benefits will be brought to the driver manufacturers. Moreover, as for the sensing motor driver manufacturers, the existing encoder interface can be used, and as long as a start detecting procedure is added in terms of software, the controlling function of the servo motor can be realized without affecting the reliability of the driver.

In addition, in the prior art, the starting position of the motor is estimated by using the UVW signals of the Hall device in the encoder, which is restricted by the amount of Hall devices, and it can only obtain that the most possible angle region of the motor is one of the six regions, so that the accuracy cannot be improved along with the practical demands, the element cost of the encoder is increased due to the Hall device, and the assembling cost of the encoder is increased as well.

SUMMARY OF THE INVENTION

Accordingly, the present invention is a method for estimating a starting position of a servo motor, which is applicable to calculate a starting angle position region of the motor by using ABZ signals of an incremental encoder.

In an embodiment, the present invention provides a method for estimating a starting position of a servo motor, which comprises the following steps. A magnetic field direction of a stator of a motor is decided from a plurality of magnetic field directions of the stator of the motor. A driving command is output according to a current signal to drive the motor to rotate, and a rotation signal is accordingly obtained. Next, when the rotation signal indicates that the motor is rotated, a rotation direction of the motor is determined. Then, possible position regions of a rotor of the motor are decided according to the rotation direction of the motor and the magnetic field direction of the stator, and an amount of the possible position regions is accumulated. Finally, the above steps are repeated until the possible position regions of the rotor are decided according to all the magnetic field directions of the stator, and a position of the rotor of the motor is decided according to an amount of the possible position regions that are finally accumulated.

In another embodiment, the present invention provides a servo motor driving system, which comprises an estimating unit, a current control circuit, and a signal processing circuit. The current control circuit drives the motor to rotate in response to a driving command. The signal processing circuit receives a rotation signal of the motor and outputs the rotation signal to the estimating unit. When the motor driving system is initially started, the estimating unit executes the following steps of: deciding a magnetic field direction of a stator of the motor from a plurality of magnetic field directions of the stator of the motor; outputting the driving command according to a current signal to drive the motor to rotate, and accordingly obtaining the rotation signal; determining a rotation direction of the motor, when the rotation signal indicates that the motor is rotated; deciding possible position regions of a rotor of the motor according to the rotation direction of the motor and the magnetic field direction of the stator, and accumulating an amount of the possible position regions; and repeating the above steps until the possible position regions of the rotor are decided according to all the magnetic field directions of the stator, and deciding a position of the rotor of the motor according to an amount of the possible position regions that are finally accumulated.

In still another embodiment, the present invention provides a servo motor system, which comprises a motor, an estimating unit, an encoder, a current control circuit, and a signal processing circuit. The motor has a rotor and a stator. The encoder is used for detecting a rotation signal of the motor. The current control circuit drives the motor to rotate in response to a driving command. The signal processing circuit receives a rotation signal of the motor and outputs the rotation signal to the estimating unit. When the motor system is initially started, the estimating unit executes the following steps of: deciding a magnetic field direction of a stator of the motor from a plurality of magnetic field directions of the stator of the motor; outputting the driving command according to a current signal to drive the motor to rotate, and accordingly obtaining a rotation signal; determining a rotation direction of the motor, when the rotation signal indicates that the motor is rotated; deciding possible position regions of a rotor of the motor according to the rotation direction of the motor and the magnetic field direction of the stator, and accumulating an amount of the possible position regions; and repeating the above steps until the possible position regions of the rotor are decided according to all the magnetic field directions of the stator, and deciding a position of the rotor of the motor according to an amount of the possible position regions that is finally accumulated.

In the motor starting control method, the motor driving system, and the motor system according to the present invention, the starting angle position region of the motor is calculated merely by using rotor rotation signals of an incremental encoder, such that a cost of the Hall device and an assembling cost are saved in terms of the cost of the encoder, and a user is enabled to increase an accuracy of the required starting position region according to an accuracy specification of products, which thus has a higher flexibility. Furthermore, the process is realized by software, such that the user can have the system architecture with a high flexibility and a higher stability.

In the method of the present invention, no Hall device is required to detect the starting position region of the motor, such that the problems of the prior art are prevented, and the cost is greatly reduced. In addition, if the requirements on the functional specification of products are quite high, the amount of the detected regions may be increased, so as to obtain the starting position with a higher accuracy. As for driver manufacturers, a starting current may be correspondingly small, such that a machine table for installing the servo motor is quite safe and highly practical.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

The detailed features and advantages of the present invention will be described in detail in the following embodiments. Those skilled in the arts can easily understand and implement the content of the present invention. Furthermore, the relevant objectives and advantages of the present invention are apparent to those skilled in the arts with reference to the content disclosed in the specification, claims, and drawings. The embodiments below are intended to further describe the views of the present invention instead of limiting the scope of the present invention.

The present invention provides a method for estimating a starting position of a servo motor, which is applicable to obtain a starting angle position of the servo motor by using a hardware architecture of an incremental encoder, thereby obtaining a starting angle of the motor without a Hall device. The method for estimating the starting position of the servo motor is usually implemented in a software manner, and implemented in a servo motor driving system.

Figure 2:
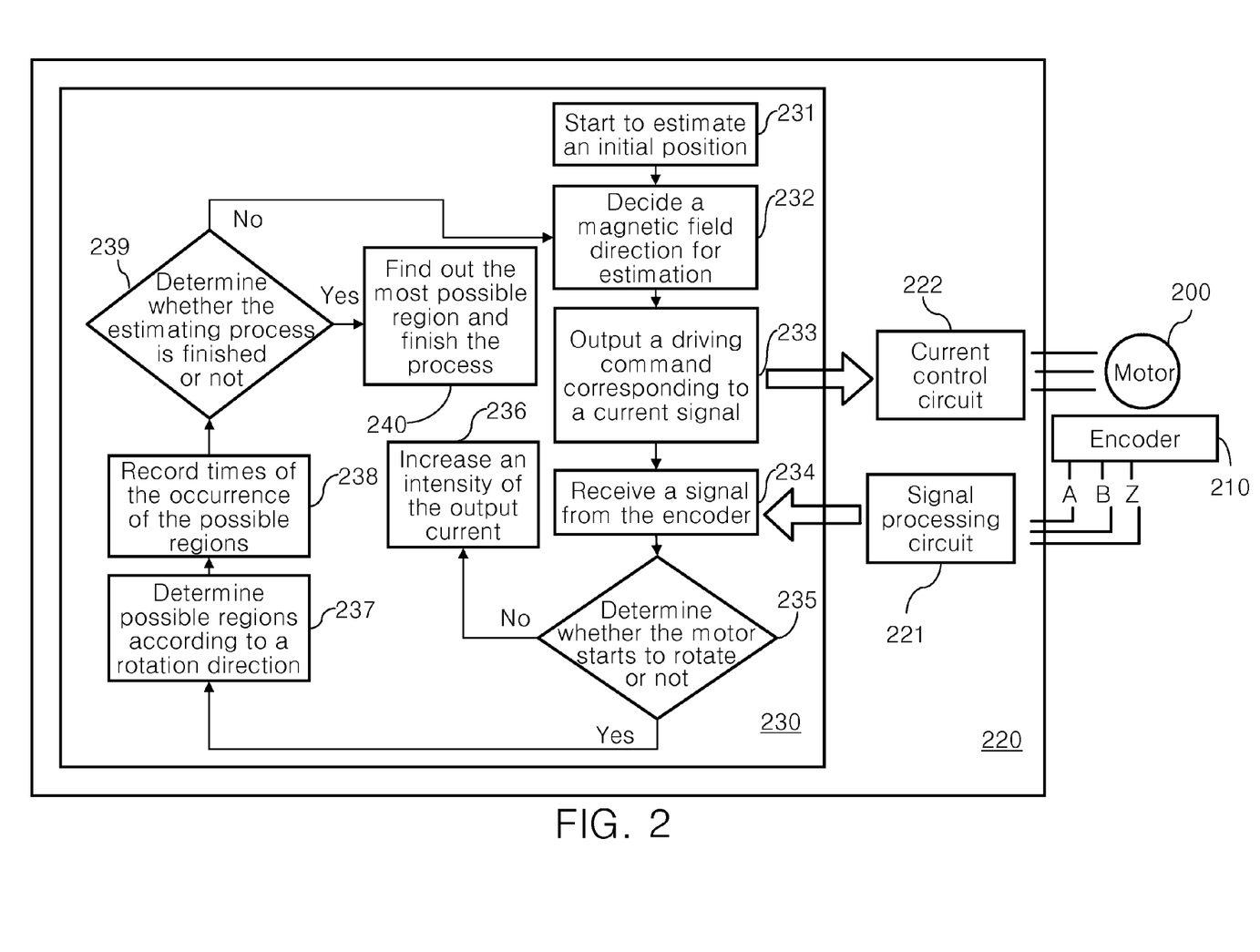
FIG. 2 is a schematic view of a servo motor driving system according to the present invention.

FIG. 2 is a schematic view of a servo motor driving system according to the present invention. Referring to FIG. 2, a driving system 220 drives a motor 200 to rotate, and in addition to the motor 200 and the driving system 220, an entire motor system further comprises an encoder 210. In an embodiment, the encoder is usually an incremental encoder. In the present invention, a position of a rotor is estimated by using rotor rotation signals (A, B, and Z) of the incremental encoder, such that the incremental encoder comprising or not comprising a Hall sensor can be used in the driving system of the present invention.

The encoder 210 detects the rotation of the motor 200 and accordingly outputs rotor rotation signals (A, B, and Z). The servo driver 220 receives the rotor rotation signals (A, B, and Z), and accordingly outputs a control command to control the motor 200. A signal processing circuit 221 in the driving system 220 receives the rotor rotation signals (A, B, and Z), processes the rotor rotation signals (A, B, and Z), and outputs the processed rotor rotation signals (A, B, and Z) to an estimating module 230. The estimating module 230 estimates the most possible regions of the rotor of the motor according to the rotor rotation signals (A, B, and Z). A rotor angle estimating means is configured in the estimating module 230, and usually the estimating means is stored in the estimating module 230 in a software manner. The estimating module 230 further outputs a current signal to a current control circuit 222, such that the current control circuit 222 outputs a corresponding current to the motor 200 to enable the motor 200 to rotate.

A process for estimating an initial angle of the rotor by the estimating module 230 is described as follows.

Figure 3:
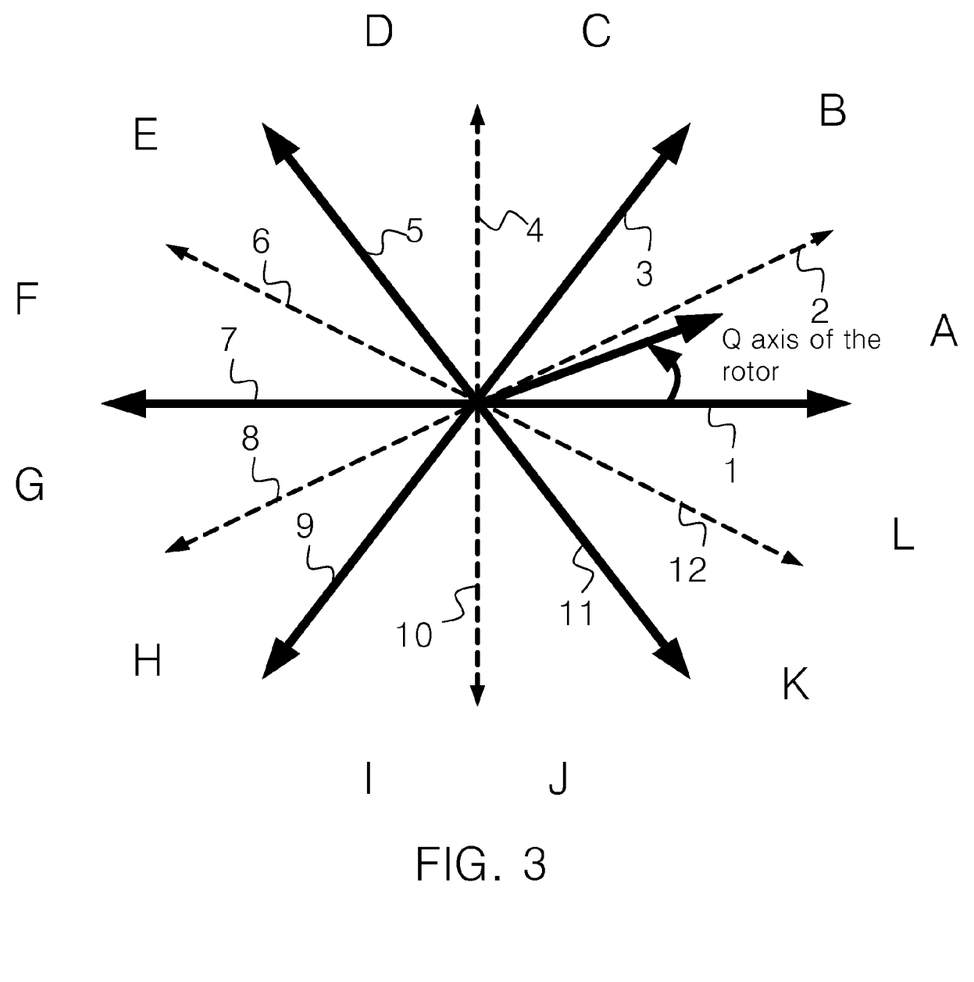
FIG. 3 is a schematic view of magnetic field directions of a stator and possible positions of a rotor in a starting control method according to the present invention.

When a detecting procedure is started (Step 231), that is, the motor system or the driving system is powered on and starts to operate, a magnetic field direction of a stator of the motor is decided from a plurality of magnetic field directions of the stator of the motor (Step 232). Here, the magnetic field direction of the stator is pre-decided, and an amount of the magnetic field directions is decided according to an estimating accuracy. The time cost by the entire detecting process is greatly associated with the accuracy required for detecting the starting angle position of the rotor, and if it intends to obtain more accurate starting angle of the rotor, more time needs to be spent on the detecting process. The stator may have quite a lot of magnetic field directions, and in this embodiment, the magnetic field directions of the stator are set to twelve directions (direction 1 to direction 12, as shown in FIG. 3), the possible starting angle positions of the rotor are correspondingly set to twelve regions (region A to region L, as shown in FIG. 3), that is, the amount of the possible starting angle regions of the rotor is consistent with the amount of the magnetic field directions of the stator. Definitely, if it intends to detect the more accurate possible angle positions of the rotor, more regions may be divided. The selection of the twelve magnetic field directions of the stator is decided in sequence or at random.

After the magnetic field direction of the stator is decided, a driving command is output to the current control circuit 222 according to a current signal (Step 233), such that the current control circuit 222 drives the motor 200 to rotate with a current corresponding to the driving command (Step 233), and accordingly obtains a rotation signal (Step 234).

In Step 233, the current signal is increased from zero until the motor is rotated. Furthermore, each time when a magnetic field of the stator is replaced, the current signal may be increased from zero or not increased from zero.

After the rotation signal is received, it is determined whether the motor starts to rotate or not according to a received signal of the encoder (Step 235). In this embodiment, it is determined whether the motor is rotated or not according to the rotor rotation signals (A, B, and Z) of the encoder.

If the motor does not start to rotate, an intensity of the output current is increased (Step 236), and the process returns to Step 234. In this embodiment, the output current is gradually increased from a small current until the motor starts to rotate, in which an increased magnitude is not limited. At this time, the rotation amplitude of the motor is quite small, and even a rotation angle thereof is nearly zero. The reason is that the servo motor finally needs to be installed on a machine table, and if even time when the machine table is powered on, the driver cannot find out the initial starting angle of the motor unless the motor is rotated for one round or rotated for a large angle, designers of the machine table may not adopt the driver. Therefore, in the detecting process, the rotation amplitude of the motor must be quite small. Furthermore, an output force of the motor in the detecting process must be carefully controlled, thereby preventing the motor from outputting an excessively large moment to damage the machine table.

When the motor starts to rotate, possible position regions of the rotor are determined according to a rotation direction (that is, a clockwise direction or an anticlockwise direction) of the rotor and the magnetic field directions of the stator (Step 237), and times of the occurrence of the possible regions are recorded (Step 238). In Step 237, it is determined whether the current rotation direction is clockwise or anticlockwise direction according to the rotor rotation signals (A, B, and Z) of the encoder.

Next, it is determined whether the estimating process is finished or not (Step 239), in which it is mainly determined whether the estimation is completed for each magnetic field direction of the stator, and if not, the process returns to Step 232, and continues to perform the estimating process for a next magnetic field direction. The above steps are repeated until the possible position regions of the rotor are decided according to all the magnetic field directions of the stator, and a position of the rotor of the motor is decided according to an amount of the possible position regions that are finally accumulated (Step 240).

After the starting position has already been detected, the detecting process is finished, and a normal operating procedure is entered. In the above process, each time when the magnetic field changes a direction, the applied current is gradually increased from a small current until the motor starts to rotate, but the current is not necessarily increased from zero.

Next, the above detecting process is further described with an embodiment.

Figure 4A:
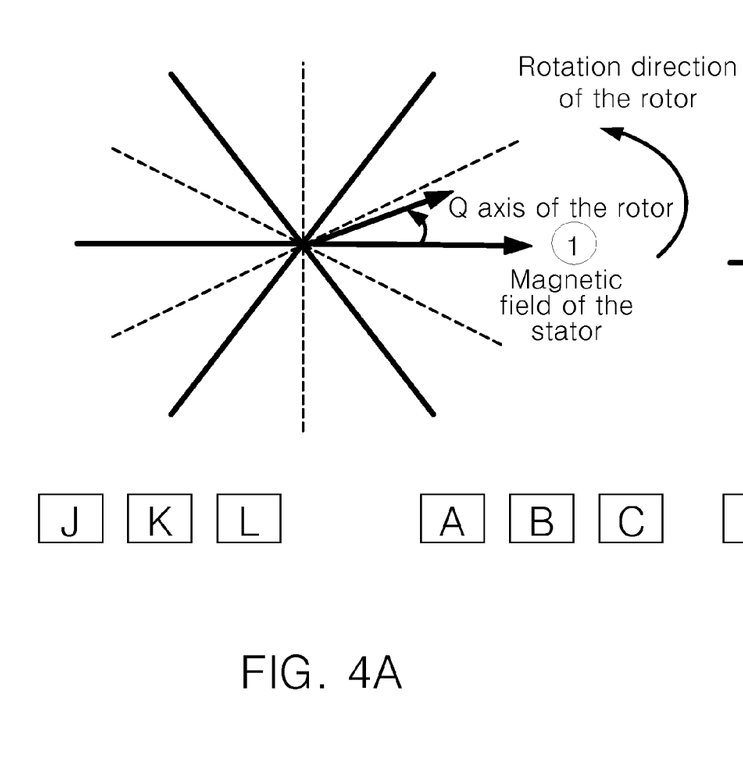
FIGS. 4A to 4L are schematic views for estimating magnetic field directions of a stator and possible positions of a rotor according to the present invention.
Figure 4B:
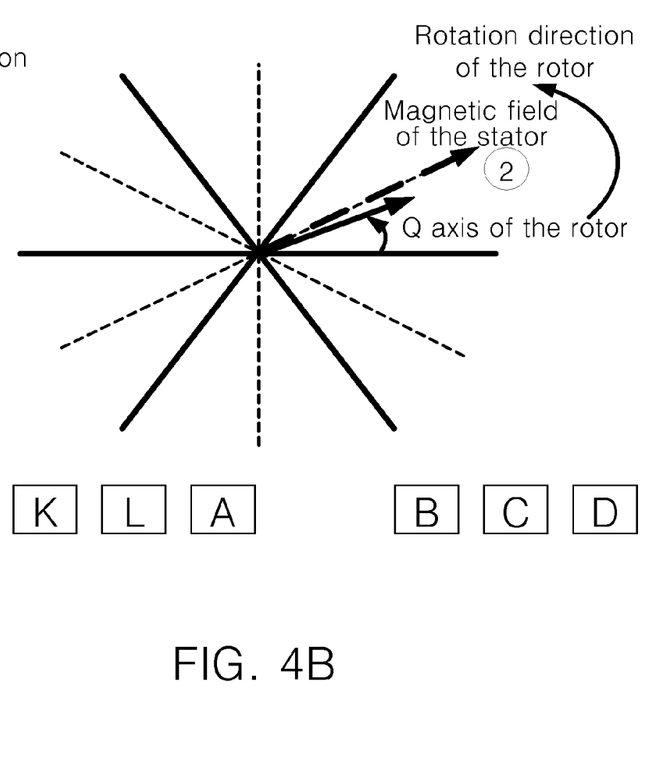
Figure 4C:
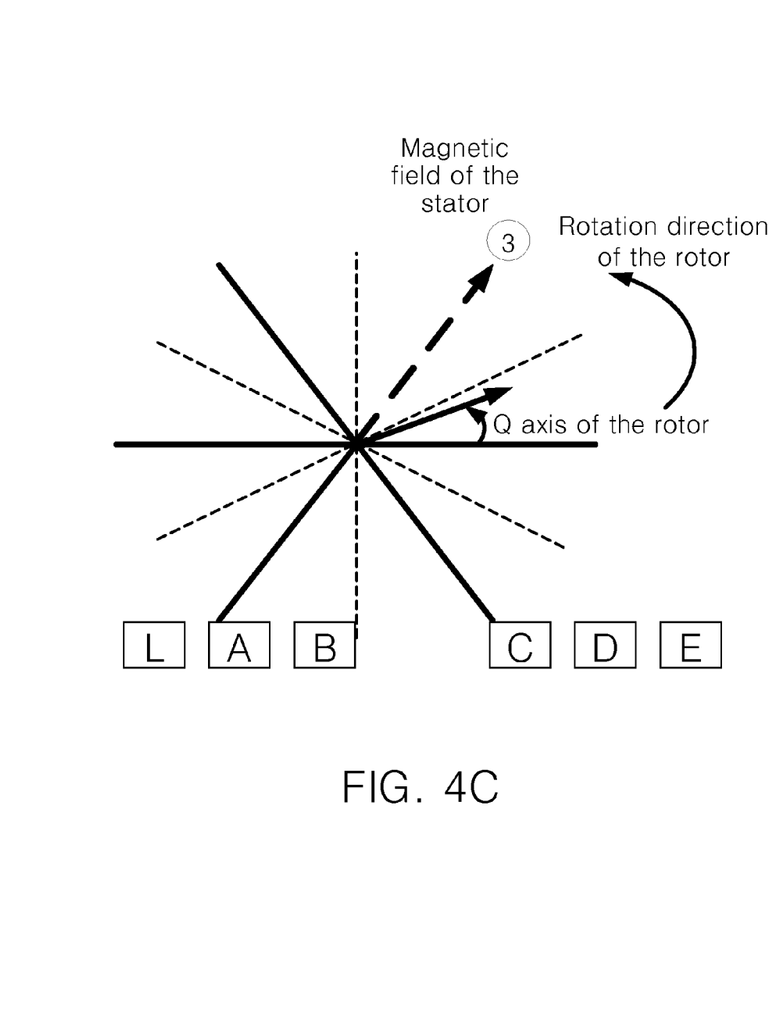
Figure 4D:
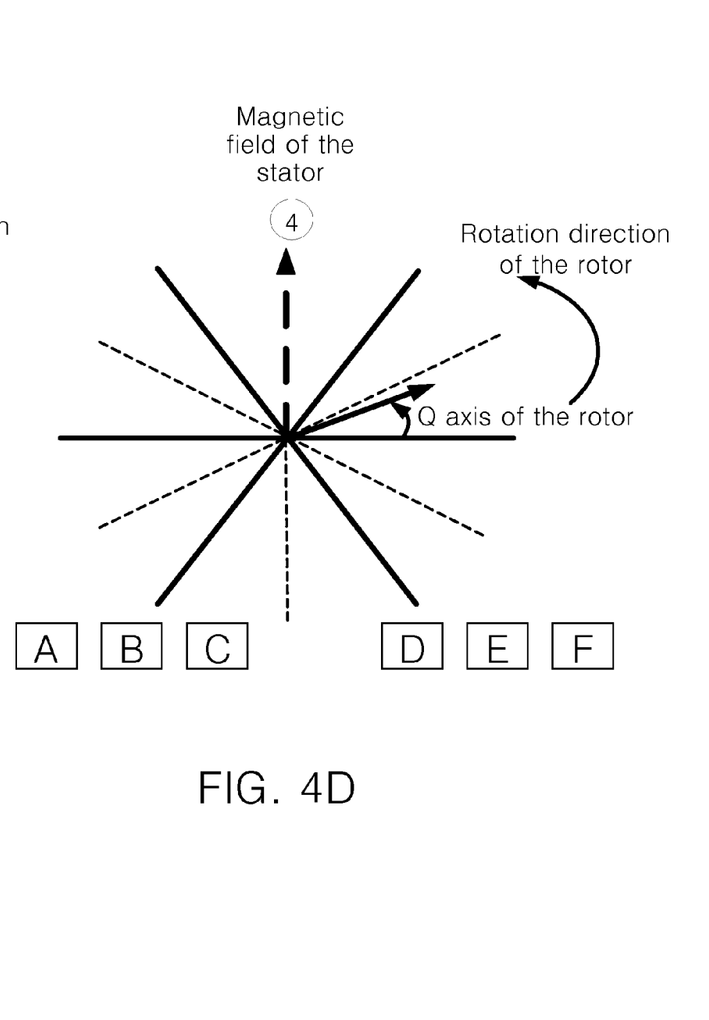

Referring to FIG. 4A, firstly, the magnetic field direction of the stator is set to the direction 1, and it is assumed that the initial position region of the rotor is the region A. If the rotor is rotated in an anticlockwise direction at this time, it is obtained that the possible positions of the rotor include six possible regions, that is, J, K, L, A, B, and C. Next, referring to FIG. 4B, the magnetic field direction of the stator is set to the direction 2, and at this time, the rotor is rotated in the anticlockwise direction, such that it is obtained that the possible positions of the rotor include six possible regions, that is, K, L, A, B, C, and D. Furthermore, referring to FIG. 4C, the magnetic field direction of the stator is set to the direction 3, and at this time, the rotor is rotated in the anticlockwise direction, such that it is obtained that the possible positions of the rotor include six possible regions, that is, L, A, B, C, D, and E. Furthermore, referring to FIG. 4D, the magnetic field direction of the stator is set to the direction 4, and at this time, the rotor is rotated in the anticlockwise direction, such that it is obtained that the possible positions of the rotor include six possible regions, that is, A, B, C, D, E, and F.

Figure 4E:
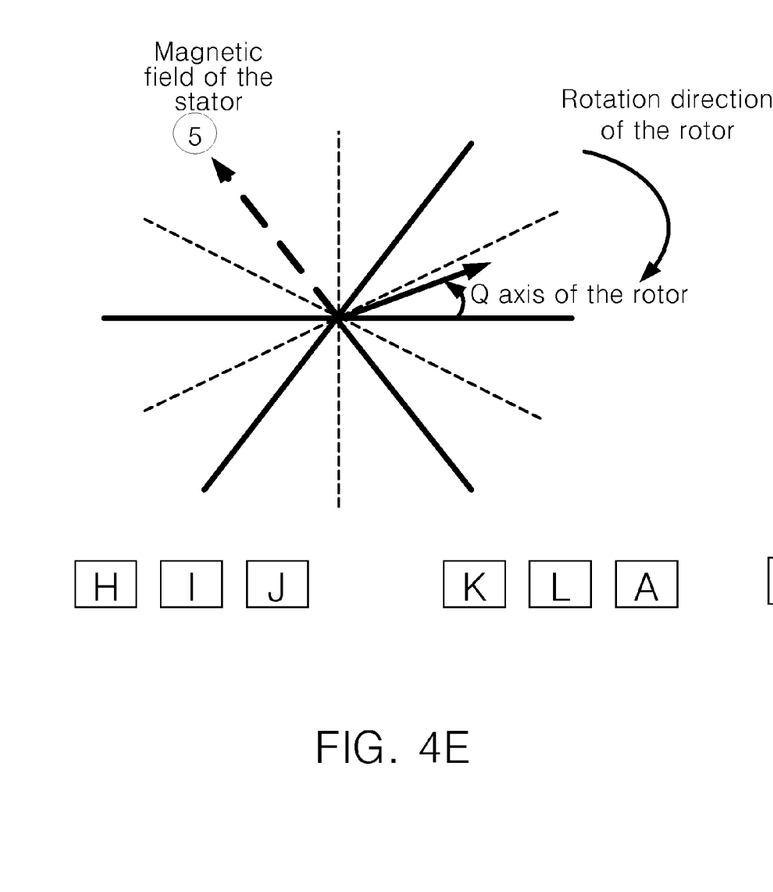
Figure 4F:
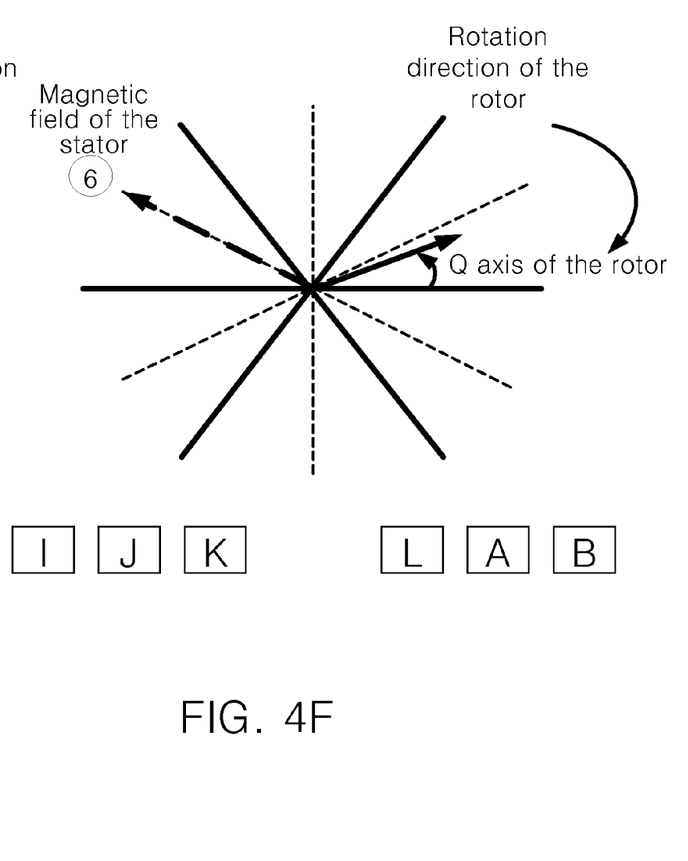
Figure 4G:
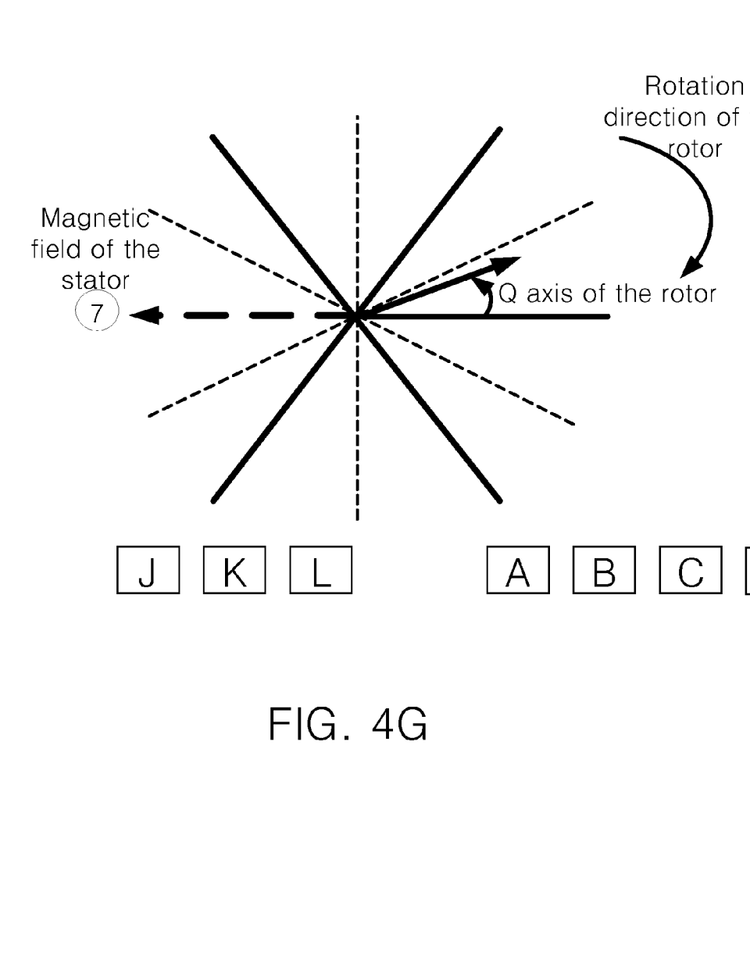
Figure 4H:
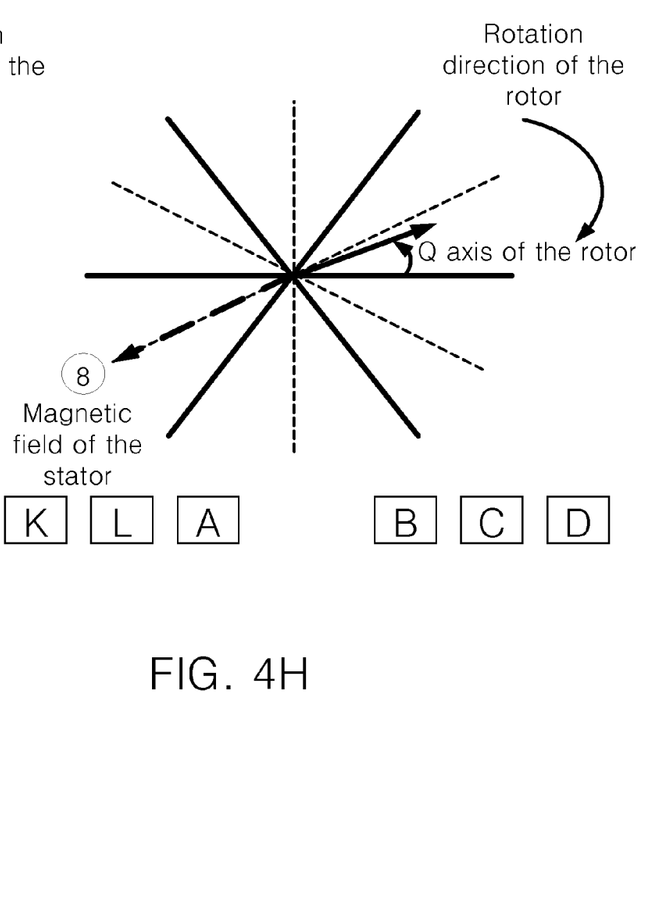

Next, the magnetic field direction is changed to a next magnetic field direction, referring to FIG. 4E, the magnetic field direction of the stator is set to the direction 5, and at this time, the rotor is rotated in a clockwise direction, such that it is obtained that the possible positions of the rotor include six possible regions, that is, H, I, J, K, L, and A. Next, the magnetic field direction is changed to a next magnetic field direction, referring to FIG. 4F, the magnetic field direction of the stator is set to the direction 6, and at this time, the rotor is rotated in the clockwise direction, such that it is obtained that the possible positions of the rotor include six possible regions, that is, I, J, K, L, A, and B. Furthermore, the magnetic field direction is changed to a next magnetic field direction, referring to FIG. 4G, the magnetic field direction of the stator is set to the direction 7, and at this time, the rotor is rotated in the clockwise direction, such that it is obtained that the possible positions of the rotor include six possible regions, that is, J, K, L, A, B, and C. Furthermore, the magnetic field direction is changed to a next magnetic field direction, referring to FIG. 4H, the magnetic field direction of the stator is set to the direction 8, and at this time, the rotor is rotated in the clockwise direction, such that it is obtained that the possible positions of the rotor include six possible regions, that is, K, L, A, B, C, and D.

Figure 4I:
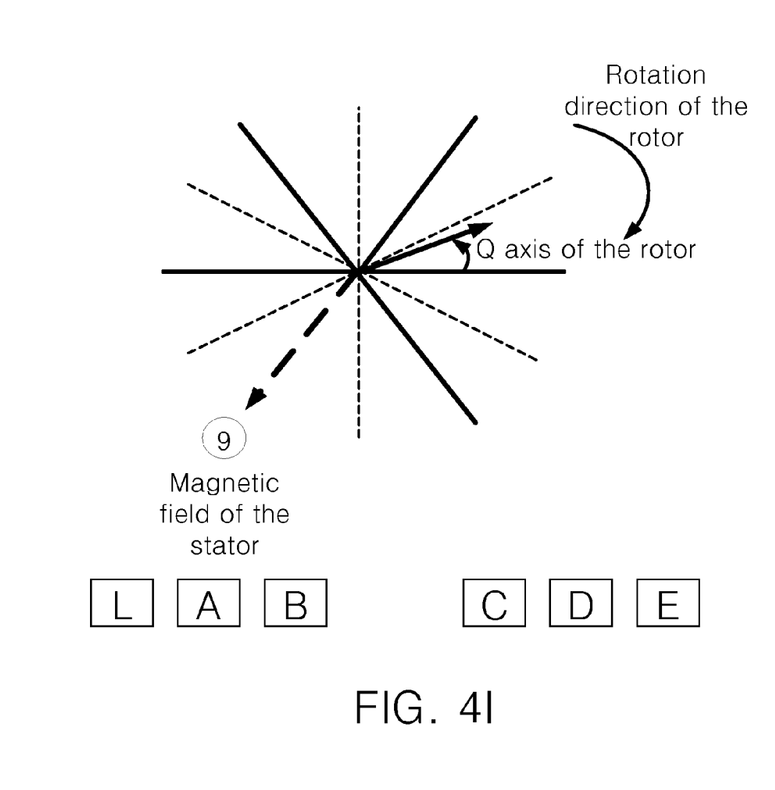
Figure 4J:
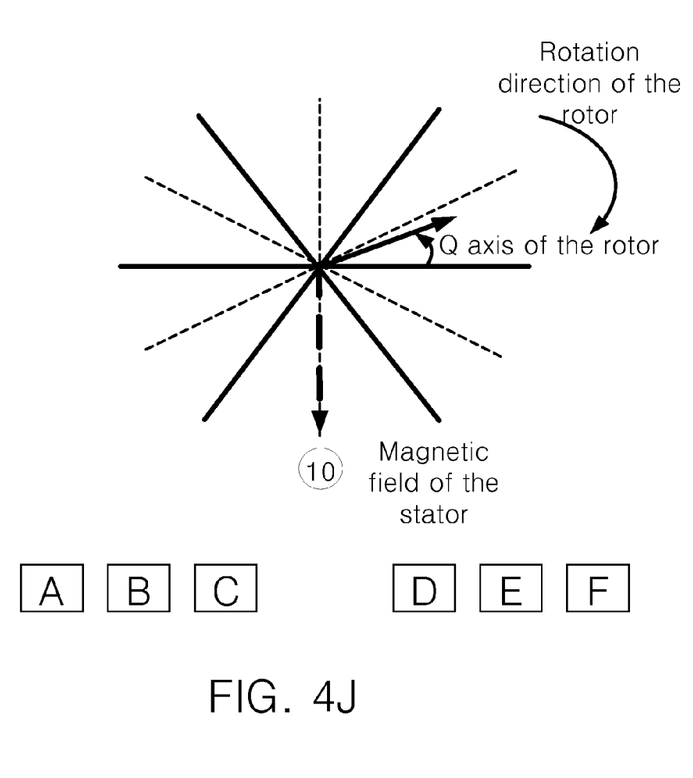
Figures 4K, 4L:
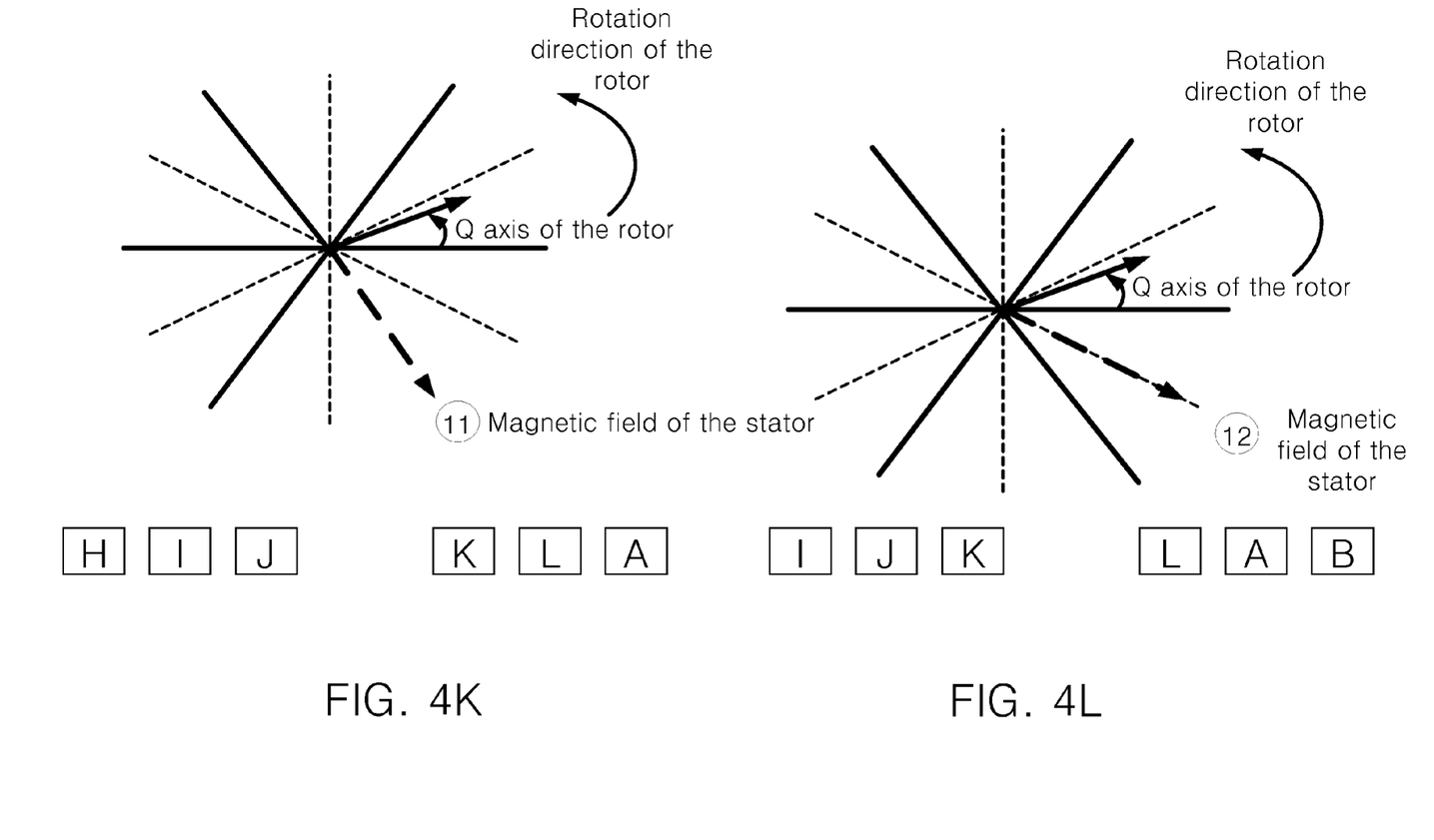

Next, the magnetic field direction is changed to a next magnetic field direction, referring to FIG. 4I, the magnetic field direction of the stator is set to the direction 9, and at this time, the rotor is rotated in the clockwise direction, such that it is obtained that the possible positions of the rotor include six possible regions, that is, L, A, B, C, D and E. Then, the magnetic field direction is changed to a next magnetic field direction, referring to FIG. 4J, the magnetic field direction of the stator is set to the direction 10, and at this time, the rotor is rotated in the clockwise direction, such that it is obtained that the possible positions of the rotor include six possible regions, that is, A, B, C, D, E, and F. Furthermore, the magnetic field direction is changed to a next magnetic field direction, referring to FIG. 4K, the magnetic field direction of the stator is set to the direction 11, and at this time, the rotor is rotated in the anticlockwise direction, such that it is obtained that the possible positions of the rotor include six possible regions, that is, H, I, J, K, L, and A. Furthermore, the magnetic field direction is changed to a next magnetic field direction, referring to FIG. 4L, the magnetic field direction of the stator is set to the direction 12, and at this time, the rotor is rotated in the anticlockwise direction, such that it is obtained that the possible positions of the rotor include six possible regions, that is, I, J, K, L, A, and B.

After the above possible situations of the rotor obtained according to the twelve magnetic field directions of the stator are accumulated, the statistic data listed in the following table may be obtained.

|       | 1  | 2  | 3 | 4 | 5 | 6 | 7 | 8 | 9 | 10 | 11 | 12 |
|-------|----|----|---|---|---|---|---|---|---|----|----|----|
| Times | 12 | 10 | 7 | 6 | 3 | 2 | 0 | 2 | 4 | 6  | 8  | 10 |

As known from the data in the above table, the first region is the most possible starting angle position of the rotor. Next, it needs to estimate the possible angle positions of the rotor. At the beginning, the possible angles of the rotor are divided into twelve regions, and one round is 360 degrees, such that each region covers a scope of 30 degrees, and then according to an expected value in statistics, it is determined that the most possible angle is in the middle of each region. As known from the data in the above table, the rotor is most possibly at the first region, such that the angle thereof is most possibly 15 degrees. Therefore, the detecting procedure is finished.

In the method for estimating the starting position of the motor in the prior art, according to the UVW signals of the Hall device of the encoder, six possible changes are obtained, and possible regions are obtained by looking up the table, such that the estimated starting positions of the motor include six possible regions, and the amount of the regions cannot be increased according to the requirements on the accuracy specification of products to obtain more accurate position possibility. First, the starting error possibly occurs when the Hall device is damaged. Second, as for encoder manufacturers, the assembling process of the Hall device increases the cost. In addition, the cost of the Hall device needs to be considered as well. Third, driver manufacturers also need to provide an interface for the Hall device, and add a chip required for processing signals of the Hall device, such that the cost and an area of a circuit board are increased.

In the control method according to the present invention, the angle of the servo motor is detected without using the Hall device, and the control accuracy of the driver is not affected. In addition, the user can use the method in a sensing motor driver, so as to control the servo motor by using the sensing motor driver. Furthermore, the using scope of the drivers is not limited by the architecture of the servo motor and the interface of the Hall sensor, such that the user has a quite high flexibility in selecting the drivers. Furthermore, when the Hall device is not used, the area of the circuit board and the cost are both saved. In view of the above description, the method has advantages of a low cost, small area, convenient installation, and high practicability. Thus, the method of the present invention can reduce the cost of the Hall device and improve the benefits, without affecting the performance of the driver.

What is claimed is:

1. A motor starting control method, comprising:
   deciding a magnetic field direction of a stator of a motor from a plurality of magnetic field directions of the stator of the motor;
   outputting a driving command according to a current signal to drive the motor to rotate, and accordingly obtaining a rotation signal;
   determining a rotation direction of the motor, when the rotation signal indicates that the motor is rotated;
   deciding possible position regions of a rotor of the motor according to the rotation direction of the motor and the magnetic field direction of the stator, and accumulating an amount of the possible position regions; and
   repeating the above steps until the possible position regions of the rotor are decided according to all the magnetic field directions of the stator, and deciding a position of the rotor of the motor according to an amount of the possible position regions that are finally accumulated.

2. The method according to claim 1, wherein the magnetic field direction of the stator is pre-decided.

3. The method according to claim 1, wherein a plurality of possible position regions of the rotor exists.

4. The method according to claim 1, wherein the amount of the possible position regions of the rotor is corresponding to an amount of the magnetic field directions of the stator.

5. The method according to claim 1, wherein the rotation direction is decided according to rotor rotation signals of an incremental encoder.

6. The method according to claim 5, wherein the incremental encoder comprises at least one or more Hall sensors.

7. The method according to claim 5, wherein the incremental encoder comprises no Hall sensor.

8. The method according to claim 1, wherein the current signal is increased from zero.

9. The method according to claim 1, wherein when the rotation signal indicates that the motor is not rotated, a current magnitude of the current signal is increased, and a driving command corresponding to the current signal with the increased current magnitude is output to drive the motor to rotate.

10. A motor driving system, comprising:
    an estimating unit, wherein when the motor driving system is initially started, the estimating unit executes following steps of:
    deciding a magnetic field direction of a stator of a motor from a plurality of magnetic field directions of the stator of the motor;
    outputting a driving command according to a current signal to drive the motor to rotate, and accordingly obtaining a rotation signal;
    determining a rotation direction of the motor, when the rotation signal indicates that the motor is rotated;
    deciding possible position regions of a rotor of the motor according to the rotation direction of the motor and the magnetic field direction of the stator, and accumulating an amount of the possible position regions; and
    repeating the above steps until the possible position regions of the rotor are decided according to all the magnetic field directions of the stator, and deciding a position of the rotor of the motor according to an amount of the possible position regions that are finally accumulated;
    a current control circuit, for driving the motor to rotate in response to the driving command; and a signal processing circuit, for receiving the rotation signal of the motor and outputting the rotation signal to the estimating unit.

11. The system according to claim 10, wherein the magnetic field direction of the stator is pre-decided.

12. The system according to claim 10, wherein a plurality of possible position regions of the rotor exists.

13. The system according to claim 10, wherein the amount of the possible position regions of the rotor is corresponding to an amount of the magnetic field directions of the stator.

14. The system according to claim 10, wherein the rotation direction is decided according to rotor rotation signals of an incremental encoder.

15. The system according to claim 14, wherein the incremental encoder comprises at least one or more Hall sensors.

16. The system according to claim 14, wherein the incremental encoder comprises no Hall sensor.

17. The system according to claim 10, wherein the current signal is increased from zero.

18. The system according to claim 10, wherein when the rotation signal indicates that the motor is not rotated, a current magnitude of the current signal is increased, and a driving command corresponding to the current signal with the increased current magnitude is output to drive the motor to rotate.

19. A motor system, comprising:
a motor, comprising a rotor and a stator;
an estimating unit, wherein when the motor system is initially started, the estimating unit executes following steps of:
deciding a magnetic field direction of a stator of a motor from a plurality of magnetic field directions of the stator of the motor;
outputting a driving command according to a current signal to drive the motor to rotate, and accordingly obtaining a rotation signal;
determining a rotation direction of the motor, when the rotation signal indicates that the motor is rotated;
deciding possible position regions of a rotor of the motor according to the rotation direction of the motor and the magnetic field direction of the stator, and accumulating an amount of the possible position regions; and
repeating the above steps until the possible position regions of the rotor are decided according to all the magnetic field directions of the stator, and deciding a position of the rotor of the motor according to an amount of the possible position regions that are finally accumulated;
an encoder, for detecting the rotation signal of the motor;
a current control circuit, for driving the motor to rotate in response to the driving command; and
a signal processing circuit, for receiving the rotation signal of the motor, and outputting the rotation signal to the estimating unit.

20. The system according to claim 19, wherein the magnetic field direction of the stator is pre-decided.

21. The system according to claim 19, wherein a plurality of possible position regions of the rotor exists.

22. The system according to claim 19, wherein the amount of the possible position regions of the rotor is corresponding to an amount of the magnetic field directions of the stator.

23. The system according to claim 19, wherein the rotation direction is decided according to rotor rotation signals of an incremental encoder.

24. The system according to claim 23, wherein the incremental encoder comprises at least one or more Hall sensors.

25. The system according to claim 23, wherein the incremental encoder comprises no Hall sensor.

26. The system according to claim 19, wherein the current signal is increased from zero.

27. The system according to claim 19, wherein when the rotation signal indicates that the motor is not rotated, a current magnitude of the current signal is increased, and a driving command corresponding to the current signal with the increased current magnitude is output to drive the motor to rotate.

* * * * *